Feb. 4, 1941.    L. POLLACK    2,230,262
LIGHT POLARIZING SYSTEM
Filed April 5, 1938
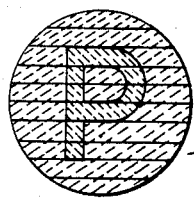
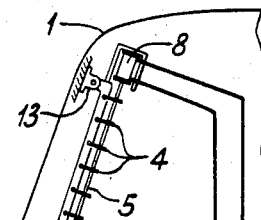
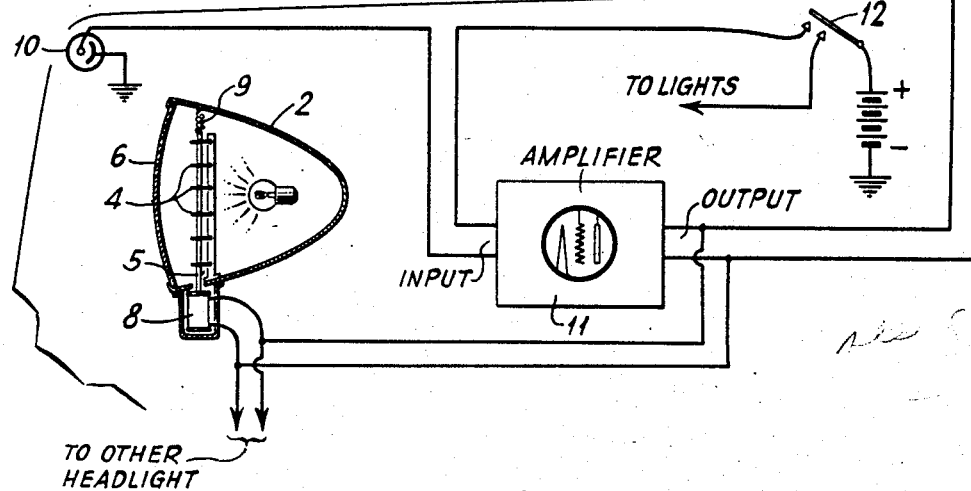
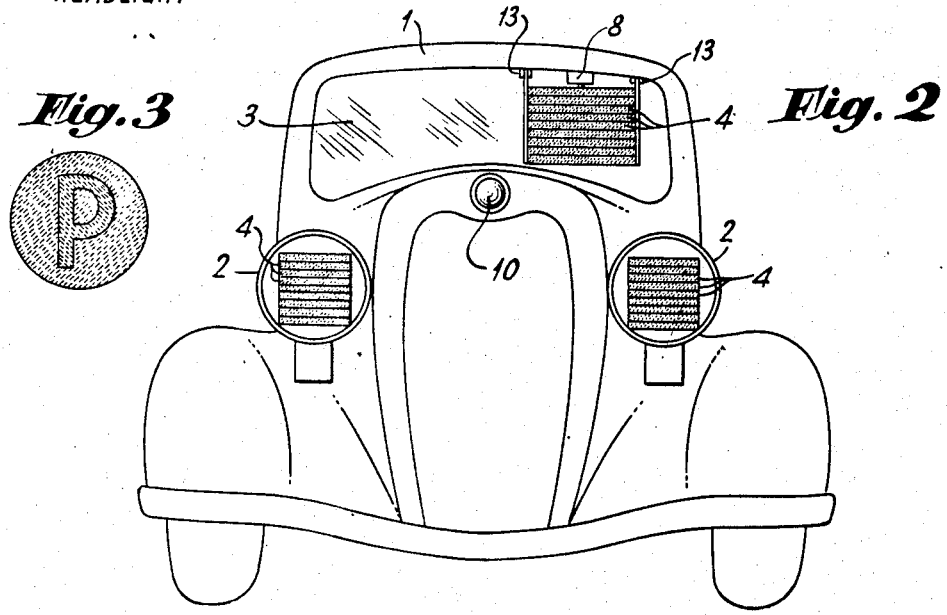
INVENTOR
Leon Pollack

UNITED STATES PATENT OFFICE 2,230,262

LIGHT POLARIZING SYSTEM

Leon Pollack, Brooklyn, N. Y.

Application April 5, 1938, Serial No. 200,139

9 Claims. (Cl. 40—130)

The present invention relates generally to vehicle lighting systems which employ light polarizing screens for preventing glare to drivers of approaching vehicles, and to polarizing screens suitable for use in such systems.

It has already been proposed to avoid glare from automobile headlights by equipping both the windshield and the headlights of the car with polarizing screens positioned so that the planes of polarization of both bodies are parallel and at an angle of approximately 45° to the horizontal. With such an arrangement, the driver of the car is able to enjoy to some extent the illuminating effect of his own lights on the roadway, while at the same time he is free from the glare of vehicles, similarly equipped, approaching him. This is because the headlight and windshield polarizing screens on his own car have their polarizing planes at right angles to those on the approaching car. Known vehicle lighting systems of this kind are described in United States Patents Nos. 2,031,045 and 2,087,795, granted, respectively, to E. H. Land and L. W. Chubb, February 18, 1936, and July 20, 1937, to which reference is made for a more complete description of their operation.

One difficulty with such known arrangements is that the polarizing screen on each headlight absorbs or blocks a considerable percentage of the light emitted by the illuminating bulb behind the screen, thus preventing the driver from enjoying the full benefit of his own headlights at such times when there are no approaching vehicles. It should be obvious that on extremely dark and seldom traversed roads, such a difficulty may make traveling extremely dangerous for the driver. Consequently, it is advantageous for the driver to have the greatest illumination possible from his own headlights, when there is no necessity to prevent glare therefrom.

The present invention, among other things, overcomes the foregoing difficulty by providing means which is automatically responsive to light for controlling the effectiveness of the polarizing screen, with a consequent control of the amount of light absorbed or blocked by said screen. More specifically, the invention contemplates equipping a vehicle with a circuit which is responsive to light from the headlights of another vehicle for controlling the position of the polarizing screen. This circuit can be made to be responsive to light emanating from another vehicle, as well as to light from other sources, such as street lamps.

Another difficulty with these known vehicle lighting systems is that it is extremely difficult to identify from a distance an approaching vehicle which should have the right of way, as for example a police car, an ambulance, or a fire truck. This difficulty is also overcome by the present invention.

According to one form of the invention, the polarizing screen for each headlight is made in the form of a plurality of cooperating flat strips or plates which can be set, in the manner of a Venetian blind, either parallel or perpendicular to the passage of the light rays, so as to permit unobstructed passage of the light rays between the strips or else complete polarization of the light rays passing therethrough. For this purpose, it is preferred to employ a photocell for controlling, through the intermediary of a solenoid, the simultaneous movement of the strips which constitute the polarizing screen of each headlight. If desired, a similar polarizing screen can be used on the windshield, and this last screen also controlled by the photocell.

In order to render the photocell circuit of the invention extremely sensitive, it is contemplated to employ in connection therewith one or more vacuum tube amplifiers, to augment the energy value of the current produced in the photocell under the influence of light. Where it is desired to control the action of the headlight polarizing screen within a predetermined range of light intensities; that is, between two limiting values of light intensity there may be employed two photocells of the Weston photronic type, each of which has individual thereto a locking circuit such as a sensitive relay. One of said photronic cells can be arranged to respond to a certain value of light intensity to position the screens to polarize the light rays from the headlights, while the other photronic cell can be arranged to reset the screens, subsequently, upon a reduction below a predetermined value of the light intensity influencing the cells, so as to permit unobstructed passage of the light rays from the headlights.

An important feature of the invention lies in the use of a headlight equipped with a polarizing screen having an identifying letter, symbol or design covering a portion of the screen which is not polarized, or polarized in a different sense from the rest of the screen, in order to convey intelligence or meaning to a person viewing the screen.

Although the invention is hereinafter described in connection with a particular circuit arrangement, it should be distinctly understood that this circuit arrangement is merely illustrative of the principles involved and not to be construed in a limiting sense.

In the accompanying drawing, in which the same parts are designated by the same reference numerals throughout the figures, Fig. 1 is a fragmentary side view, mostly diagrammatic, of an automobile equipped, by way of example only, with one arrangement for carrying out my invention; Fig. 2 is a front view of the automobile of Fig. 1, showing the polarizing screens in a position which is effective to polarize the rays of light passing therethrough; and Figs. 3 and 4 are views of specific forms of polarizing screens in accordance with the invention, which contain an intelligence bearing symbol.

Referring to the drawing, there is shown an automobile 1 in which the headlights 2, 2 and the windshield 3 are each equipped with a polarizing screen of the Venetian blind type, such as shown at 4, for plane polarizing the light passing the screen. The polarizing screens each consist of a plurality of flat light polarizing strips or plates simultaneously movable into one of two positions by a rod 5. In one of these positions, shown in Fig. 1, the strips are parallel to one another to permit the unobstructed passage of the light rays between them. In the other position, shown in Fig. 2, the strips are aligned in a single substantially vertical plane so as to be perpendicular to the passage of the light rays for the purpose of polarizing said rays. When in this last position, it is preferred that the edges of adjacent strips abut one another to form a smooth continuous surface without any overlapping of the strips; also that the plane of polarization of the screen be at an angle of 45° to the horizontal, and further that the planes of polarization in the screens on the headlights and windshield of each car be parallel. The broken lines in the screens, illustrated in Fig. 2, indicate generally the preferred angle of polarization.

The polarizing screen in each headlight is preferably positioned behind a headlight cover glass 6, and the polarizing screen for the windshield positioned in the car in the manner of the known types of adjustable sun vizors. The screen 4 for the windshield is hinged on brackets 13 so that the entire polarizing screen can be raised or lowered by the driver at will. This windshield screen can be of any suitable construction, such as a single continuous screen, instead of the Venetian blind type, and need not be connected to the headlight and photocell system to be described in more detail later.

The strips of the polarizing screen may comprise any suitable polarizing body; for example, a thin sheet of cellulosic material in which there are dispersed colloidal particles oriented with their polarizing axes in substantial parallelism. This sheet may be cemented between two optically transparent glass plates to form a transparent lens. Various methods of making such a sheet are described in E. H. Land United States Patents Nos. 2,011,553, August 13, 1935; 1,989,371, January 29, 1935; and 1,918,848, July 18, 1933. The strips, of course, may be made in other ways, as for example in the manner described in A. M. Marks United States Patent No. 2,104,949. Since the method of making these strips forms no part of the present invention, it is not deemed necessary to further describe their mode of manufacture.

In order to move the strips 4 into operative position to polarize the light rays, the rod 5 for each screen is arranged to be in movable relation to a solenoid 8, in turn responsive to electrical current passing through the coil of the solenoid. The solenoids for the screens of the headlights and the windshield are connected in electrically parallel relation so as to be simultaneously effective. Normally, the strips of each screen are maintained parallel to each other by means of a spring 9, to permit the unobstructed passage of the light rays between the strips. This normal position of the strips is effected whenever there is no flow of current through the solenoid.

In order to control the position of each screen, automatically, in response to light emanating from the headlights of another vehicle, or from a street lamp, there is provided a photocell 10 positioned in the front of the automobile 1 out of the direct path of the light rays from its associated headlights. Photocell 10 is connected to a suitable vacuum tube amplifier 11 over a circuit leading through the light switch 12 of the automobile, so that the cell can only be effective subsequent to the closure of the light switch. Amplifier 11 may have any suitable number of vacuum tubes and serves to augment the energy value of the current produced in the photocell under the influence of light, thus making the circuit very sensitive to light impinging on the cell.

While I have described and shown a particular means of transmitting the control currents from the photocell 10 to the solenoids 8, any other means known in the art may be used for directly or indirectly effecting the controlling action of the polarizing screens 4.

One advantage of the present invention is that in fog and on extremely dark roads where the light from street lamps and approaching vehicles is insufficient to effectively influence the photocell to close the headlight polarizing screens, the driver will have the greatest possible light from his own headlights to illuminate the road.

In one desirable form of the invention, the polarizing screen on the headlight bears one or more identifying letters, a symbol, or a design. The design or symbol on the screen may cover an area which is colored or uncolored and does not polarize light, or polarizes light at an angle differently with respect to the rest of the screen, and if the latter, it is preferred that it polarize light at right angles to the angle of polarization of the rest of the screen. In this way, a person viewing the screen through a polarizing windshield whose angle of polarization is at right angles to the angle of polarization of the screen on the approaching headlight will be able to see only the identifying design on the headlight screen. This particular feature, it should be understood, may be used in conjunction with the polarizing slats 4, indicated in Fig. 1 and Fig. 2, or else independently thereof, such as in connection with a single sheet of polarizing material. Fig. 4 illustrates a polarizing screen for a headlight of the type just described, wherein use is made of a multiplicity of polarizing slats with the identifying symbol or letter covering predetermined areas on the cooperating slats.

It is to be understood that the invention is not limited to the precise arrangements illustrated, but that the principles involved cover all systems falling within the scope of the appended claims. Where it is not desired to use an automatic control based on the photocell principle, it is within the scope of the invention to use the movable polarizing screen above described (employing flat strips or plates), or some other arrangement for a similar purpose, such as a shutter, with a mechanical control within easy reach of the driver's seat.

What is claimed is:

1. In a vehicle, a headlight including a light transmitting and polarizing screen having an area which affects light differently from other portions of said screen, said area being in the form of an intelligence bearing symbol, a source of light behind said screen and impressing rays of light upon said screen for illuminating the space in front of said screen.

2. In a vehicle headlight system, a headlight including a light transmitting and polarizing screen for plane polarizing light passing therethrough, said screen having a predetermined identifying area whose angle of polarization is different from the angle of polarization of the rest of the screen, and a source of illumination located behind said screen and impressing rays of light upon said screen for illuminating the space in front of said screen.

3. In a vehicle headlight system, a headlight comprising a source of light, a light transmitting and polarizing body positioned in the path of the beam emanating from said source, one portion of said light-polarizing body covering a predetermined identifying area having a polarizing axis at right angles to the polarizing axis of another portion of said light polarizing body, said source of light functioning to illuminate the space in front of said polarizing body.

4. In a vehicle headlight system, a headlight comprising a source of light, a light transmitting and polarizing body positioned in the path of the beam emanating from said source, the major area of said light polarizing body being arranged to plane polarize along a desired axis the light from said beam passing therethrough, said light polarizing body having a predetermined area in the form of a letter of the alphabet which does not plane polarize light along said axis, said source of light functioning to illuminate the space in front of said polarizing body.

5. The combination with a first light transmitting and polarizing screen having a source of illumination positioned behind it, of a second light transmitting and polarizing screen located on a vehicle and positioned to intercept the view of an occupant of said vehicle, the axes of said light transmitting and polarizing screens being optically crossed, whereby said second screen is opaque to the polarized light from said first screen, said first screen having a predetermined identifying area which admits polarized light optically coinciding with said second screen, whereby said second screen admits light from said first screen passing through said predetermined area.

6. A headlight system for a motor vehicle comprising lamps, each lamp being provided with a screen for transmitting and polarizing a beam of light in a plane having a predetermined angle to the horizontal to be transmitted ahead of the vehicle, and a protective device for the driver of the vehicle comprising a light transmitting and polarizing device that optically coincides with the polarizing screens for the lamps, whereby the protective device admits light polarized in the same plane as that of the light of said lamps but is opaque to the light of approaching vehicles similarly equipped, at least one polarizing screen of said lamps having a predetermined area thereof in the form of an identifying symbol for enabling light to pass therethrough which does not optically coincide with said protective device.

7. A headlight system for a motor vehicle comprising lamps, each lamp being provided with a screen for transmitting and polarizing a beam of light in a plane having a predetermined angle to the horizontal to be transmitted ahead of the vehicle, and a protective device for the driver of the vehicle comprising a light transmitting and polarizing device that optically coincides with the polarizing screens for the lamps, whereby the protective device admits light polarized in the same plane as that of the light of said lamps but is opaque to the light of approaching vehicles similarly equipped, at least one polarizing screen of said lamps having a predetermined area thereof in the form of an identifying symbol for enabling polarized light to pass therethrough which is optically crossed with respect to said protective device, whereby said protective device is opaque to said light transmitted through said predetermined area.

8. A vehicle headlight comprising a source of light, a light transmitting and polarizing screen positioned in the path of the beam emanating from said source and so constructed and arranged as to be movable to a position substantially parallel or perpendicular to the rays of light from said source, said screen having a portion thereof covering a predetermined area which affects light differently from another portion.

9. A vehicle headlight having a light transmitting and polarizing screen comprising a multiplicity of cooperating flat polarizing bodies so constructed and arranged as to be simultaneously movable to a position substantially parallel or perpendicular to the rays of light to be polarized, said bodies each having a portion thereof covering a predetermined area which affects light differently from another portion of the same body, said areas cooperating to form an intelligence bearing symbol.

LEON POLLACK.